US012703122B2

(12) United States Patent
Rößler et al.

(10) Patent No.: US 12,703,122 B2
(45) Date of Patent: Aug. 11, 2026

(54) CEMENT PREMIXER, A DEVICE FOR PRODUCING A CONCRETE MIXTURE AND A METHOD FOR PRODUCING A CEMENT SUSPENSION

(71) Applicant: SONOCRETE GMBH, Cottbus (DE)

(72) Inventors: Christiane Rößler, Jena (DE); Ricardo Remus, Cottbus (DE)

(73) Assignee: Sonocrete GmbH, Cottbus (DE)

( * ) Notice: Subject to any disclaimer, the term of this patent is extended or adjusted under 35 U.S.C. 154(b) by 738 days.

(21) Appl. No.: 17/632,077

(22) PCT Filed: Jul. 29, 2020

(86) PCT No.: PCT/EP2020/071412
§ 371 (c)(1),
(2) Date: Feb. 1, 2022

(87) PCT Pub. No.: WO2021/023598
PCT Pub. Date: Feb. 11, 2021

(65) Prior Publication Data

US 2022/0274287 A1 Sep. 1, 2022

(30) Foreign Application Priority Data

Aug. 2, 2019 (DE) ..................... 10 2019 120 939.0

(51) Int. Cl.
*B28C 5/48* (2006.01)
*B28C 5/00* (2006.01)
*B01F 31/80* (2022.01)

(52) U.S. Cl.
CPC .............. *B28C 5/485* (2013.01); *B28C 5/006* (2013.01); *B01F 31/83* (2022.01); *B01F 31/89* (2022.01)

(58) Field of Classification Search
CPC . B28C 5/485; B28C 5/12; B28C 5/006; B01F 31/80; B01F 31/83
See application file for complete search history.

(56) References Cited

U.S. PATENT DOCUMENTS 5,470,148 A * 11/1995 Gorr .................. B01F 27/0724 416/231 A
6,039,470 A * 3/2000 Conwell ................ B01F 25/50 366/137
(Continued)

FOREIGN PATENT DOCUMENTS

CH 491730 A 6/1970
CN 102284326 A 12/2011
(Continued)

OTHER PUBLICATIONS

Peters, Simone (2017): The Influence of Power Ultrasound on Setting and Strength Development of Cement Suspensions. Doctoral Thesis Bauhaus-Universität Weimar, 2017. (Year: 2017).*
(Continued)

*Primary Examiner* — Marc C Howell
(74) *Attorney, Agent, or Firm* — PATENT PORTFOLIO BUILDERS PLLC

(57) ABSTRACT

A cement premixer includes a treatment container having a treatment space. The treatment container has a side wall and a bottom, and at least one stirring unit at least partially projecting into the treatment space. The stirring unit is connected to a shaft having an axis of rotation. At least one ultrasonic probe projects at least partially into the treatment space. At least one ultrasonic oscillator applies ultrasound to the at least one ultrasonic probe. The cement premixer has at least one first introduction opening for the supply of
(Continued)

cement and an outlet for the flow supply line for feeding a cement suspension provided by the cement premixer into a concrete-mixing device.

19 Claims, 4 Drawing Sheets

(56) References Cited

U.S. PATENT DOCUMENTS

| | | | | |
|---|---|---|---|---|
| 2003/0227819 | A1* | 12/2003 | Villwock | B01D 19/0063 366/151.1 |
| 2007/0270786 | A1* | 11/2007 | Higham | C08F 265/04 606/13 |
| 2010/0246312 | A1* | 9/2010 | Welker | B28C 5/003 366/4 |
| 2013/0256924 | A1* | 10/2013 | Osaki | B01F 25/54 261/36.1 |
| 2015/0224460 | A1* | 8/2015 | Banus | B01F 31/83 366/108 |

FOREIGN PATENT DOCUMENTS

| | | | | |
|---|---|---|---|---|
| CN | 107803934 | A | 3/2018 | |
| CN | 208133309 | U | 11/2018 | |
| DE | 1584305 | A1 | 9/1971 | |
| DE | 29604743 | U1 | 7/1996 | |
| DE | 102007027080 | A1 | 12/2008 | |
| DE | 102017206660 | A1 | 10/2018 | |
| EP | 1065033 | A2 * | 1/2001 | B01F 15/0251 |
| GB | 1182335 | A | 2/1970 | |
| GB | 2419099 | A * | 4/2006 | B01F 15/0031 |
| JP | H0970811 | A | 3/1997 | |
| JP | 3201292 | B2 | 8/2001 | |
| RU | 2410237 | C1 | 1/2011 | |
| RU | 2496748 | C1 | 10/2013 | |
| RU | 2533516 | C1 | 11/2014 | |
| WO | 2014127761 | A1 | 8/2014 | |

OTHER PUBLICATIONS

Ganjian et al. “Application of power ultrasound to cementitious materials: Advances, issues and perspectives” Materals and Design, 160 (2018) 501-513.*

Ludwig et al.; “The Influence of Power Ultrasound on Setting and Strength Development of Cement Suspensions;” Dissertation; Fakultät Bauingenieurwesen der Bauhaus-Universität Weimar; Jan. 20, 2016.

Office Action dated Dec. 1, 2023 in related/corresponding EP Application No. 20 756 780.1.

Mason et al.; “Applied Sonochemistry: The Uses of Power Ultrasound in Chemistry and Processing;” 2002; Wiley-VCH Verlag Gmbh & Co. KGaA.

Examination Report created Aug. 28, 2020 in related/corresponding DE Application No. 10 2019 120 939.0.

Examination Report created Jun. 3, 2020 in related/corresponding DE Application No. 10 2019 120 939.0.

International Search Report mailed Nov. 16, 2020 in related/corresponding International Application No. PCT/EP2020/071412.

Kraus; “Einfluss von Leistungs-Ultraschall auf die Fließeigenschaften und frühe Hydratation von Portland-Zementleim;” Diplomarbeit; Jun. 9, 1978; https://docplayer.org/79001395-Bauhaus-universitaet-weimar-fakultaet-bauingenieurwesen-f-a-finger-institut-fuer-baustoffkunde-diplomarbeit.html.

Stark et al.; “Dauerhaftigkeit von Beton;” 2., aktualisierte und erweiterte Auflage; Springer 2013; https://link springer.com/content/pdf/bfm%3A978-3-642-35278-2%2F1.pdf.

Weisheit et al.; “Möglichkeiten der Wärmerückgewinnung in der Betonfertigteilherstellung;” Conference Paper, Sep. 2018; https://www.researchgate.net/publication/334883409.

Written Opinion mailed Nov. 16, 2020 in related/corresponding International Application No. PCT/ EP2020/071412.

Office Action dated Mar. 31, 2026 in related/corresponding JP Application No. 2025-048236.

* cited by examiner

CEMENT PREMIXER, A DEVICE FOR PRODUCING A CONCRETE MIXTURE AND A METHOD FOR PRODUCING A CEMENT SUSPENSION

BACKGROUND AND SUMMARY OF THE INVENTION

Exemplary embodiments of the invention relate to a cement premixer for producing a cement suspension, a device for producing a concrete mixture comprising such a cement premixer, and a method for producing a cement suspension and/or a concrete or mortar mixture.

Precast concrete elements are very important in the construction industry due to their weather-independent production. The precast elements can be produced in high quality all year round. However, the production of concrete with current techniques involves a large input of materials and energy. To ensure an efficient precast production process, the concrete must have rapid strength development to minimize the turnaround time of precast production. Rapid strength development is typically provided with highly reactive Portland cements and heat treatment of the concretes. However, highly reactive Portland cements are very expensive and have a significant carbon footprint. Additional heat treatment of concretes can be implemented using superheated steam or thermal oil directly in the formwork or in heat chambers with hot air. This consumes considerable amounts of fuels, which in turn cause high $CO_2$ emissions. In addition, around one third of the heat produced is used to heat the steel formwork, and this proportion is therefore also not available to accelerate the chemical reaction. This problem is addressed and discussed by Weisheit et al; Möglichkeiten der Wärmerückgewinnung in der Betonfertigteilherstellung (Possibilities of heat recovery in precast concrete production), 2018, ibausil, Weimar, Germany, pp. 1146-1153, Volume 1, ISBN 78-3-00-059950-7.

Furthermore, a heat treatment cannot be increased arbitrarily, since too high treatment temperatures of the concrete can lead to structural damage and to considerable losses in the durability of the concrete. This is illustrated, among others, by Stark, Jochen; Wicht, Bernd (2013): Dauerhaftigkeit von Beton (Concrete durability). $2^{nd}$ updated and extended edition Berlin: Springer Vieweg.

The use of chemical accelerators allows an increase in compressive strength. However, the chemical accelerators may interact negatively with other concrete constituents and may not be economical as a substitute for heat treatment. Furthermore, the compressive strength achieved by chemical accelerators may not be sufficient at low temperatures to maintain a fast and efficient process.

DE 10 2017 206 660 A1 describes a device for producing a concrete or mortar mixture directly in a concrete mixer using high-frequency oscillations. These high-frequency oscillations are transmitted into the concrete or mortar mixture, which contains cement, sand, gravel, grit, possibly further admixtures and water.

RU2496748C1 and RU2533516C1 describe methods for mixing and ultrasonically treating water and or cement-water mixtures, wherein these methods differ in the choice of ultrasonic parameters and the resulting physical effects with reference to the present invention.

In the aforementioned documents, an intensity of up to 2.5 W/cm$^2$ is described, which leads into the range of so-called stable cavitation. This means gas/vapor bubbles grow and oscillate around their position over many acoustic cycles. See, among others, Mason, Timothy James; Lorimer, John Phillip (2002): Applied sonochemistry. The uses of power ultrasound in chemistry and processing. Weinheim: Wiley-VCH.

In the present invention, much higher intensities (25-250 W/cm$^2$) are chosen to generate a so-called transient cavitation. This means gas/vapor bubbles grow in the ultrasonic field and exist only for a few acoustic cycles before they implode releasing large amounts of energy (heat+pressure) and thus generate cavitation.

Furthermore, in RU2496748C1, RU2533516C1 an increase of ambient pressure during sonication is proposed, whereas the present invention preferably operates at ambient pressure (1 bar+/−0.1 bar).

RU2410237C1 discloses intensities in the range of the invention disclosure 7-70*10$^4$ W/m$^2$ but without specification of ultrasonic amplitudes and with the aim of dispersing and/or grinding cement.

Exemplary embodiments of the present invention are directed to a cement premixer of the type mentioned above and a method of the type mentioned above in which the cement premixer can be integrated into existing plants and, on the other hand, the method using this device enables faster, more efficient and cost-effective strength development of the concrete.

A cement premixer according to the invention comprises a treatment container having a treatment space, wherein the treatment container comprises a side wall and a bottom. It further comprises at least one stirring unit extending at least partially into the treatment space, wherein the stirring unit is connected to a shaft having an axis of rotation. In addition, the cement premixer comprises at least one ultrasonic probe extending at least partially into the treatment space. Finally, the cement premixer comprises at least one ultrasonic oscillator, for example a piezoelectric element, which applies ultrasound to the at least one ultrasonic probe.

The ultrasonic probe is designed, in particular, as a sonotrode and preferably operates in the following range (values refer to T=25° C. and normal pressure):

Intensity of the ultrasound emitted by the ultrasonic probe: 25-250 W/cm$^2$

When ultrasound is introduced into a medium, the particles and the medium are made to oscillate. This oscillation transfers kinetic energy of the ultrasonic wave. The intensity (I) corresponds to the power, e.g., watts, that is transported per area. The unit is power per area (e.g., W/cm$^2$).

Amplitude of the ultrasound emitted by the ultrasound probe: 15-500 μm.

The amplitude (u) describes the deflection of the ultrasonic wave (e.g., in μm). At constant frequency, higher amplitudes lead to an increase in intensity. The greater the amplitude, the greater the pressure differences during high-pressure and low-pressure cycles.

Frequency of the ultrasound emitted by the ultrasonic probe: preferably 10-30 kHz.

The frequency (f) describes the rate of oscillation at the tip of the ultrasonic probe. Since the formation, growth, and implosion of vapor bubbles is a time-dependent process, higher frequencies result in smaller cavitation bubbles.

Specific energy input (into the medium—water): preferably 25-250 Ws/ml

The aforementioned values can be determined electroacoustically in water using a hydrophone, for example.

The cement premixer according to the invention has at least a first introduction opening for the supply of cement and an outlet for the flow supply of a cement suspension provided by the cement premixer into a concrete mixing device or into a concrete mixer.

Furthermore, the cement premixer according to the invention may comprise a control and/or regulating device, which is equipped to adjust the operation of the cement premixer in the above-mentioned operating range.

The side wall and the bottom close off the treatment space laterally and downward. The side wall extends, in particular, along the axis of rotation of the stirring unit. A lid can close the treatment space at least partially at the top.

Water can also be supplied through the introduction opening in addition to the supply of cement. Alternatively, water can be fed through another introduction opening via another inlet pipe.

The outlet can preferably have an outlet opening. This is preferably arranged in the bottom of the treatment container. The outlet can, for example, be designed as a drain pipe with a flanged end connection. A chute is also conceivable as an outlet.

The outlet has a regulating device, for example a metering device, in particular a metering valve, by means of which the feed quantity of cement suspension into the concrete mixer can be regulated. As an alternative to a valve, an adjustable flap or a sluice can also be provided.

Likewise, the inlet may include a regulating device for regulating the feed quantity of cement and/or water and/or other admixtures into the treatment container. This may be, for example, a solids valve or an adjustable solids flap. If the water and/or the further admixtures are fed into the treatment container through separate inlets, e.g., inlet pipes, these can also each have a separate regulating device.

In the cement premixer, the stirring unit can be coupled to a drive unit via the shaft and move within the treatment space by rotation.

The ultrasonic oscillator may include a controller for adjusting an amplitude of the oscillations. The amplifier and the adjustment of the amplitude that can be made by means of this amplifier, as well as the resulting intensity of the ultrasonic oscillations, enable the oscillations to be easily adapted to different requirements in the production of different cement suspensions. This setting and the time interval of the ultrasonic treatment correspond to an energy input that can be adapted to the volume of the cement suspension.

In a further embodiment of the cement premixer, the cement premixer has a mechanical interface, preferably a flange, via which it can be connected to the concrete mixer, preferably in a medium-tight manner.

For this purpose, the concrete mixer can have a counter flange to detachably connect it to the flange from the cement premixer as a flange connection. In this case, a drain pipe may be present in the bottom of the treatment container for transferring the cement suspension produced, for example, to a concrete or mortar mixer.

In another embodiment of the cement premixer, the at least one ultrasonic probe extends at least partially into the treatment space through the side wall of the treatment container.

In a further embodiment of the cement premixer, the treatment container has an axially symmetrical, preferably rotationally symmetrical side wall, wherein the axis of symmetry of the side wall preferably extends parallel to the axis of rotation of the stirring unit.

In the case of a rotationally symmetrical side wall, this has a largely cylindrical shape. The axis of symmetry and the axis of rotation can coincide.

In another embodiment of the cement premixer, the side wall has an extension in the half towards the bottom that extends around the entire circumference of the side wall concentrically to the axis of rotation. The extension extends away from the axis of rotation.

In another embodiment, the ultrasonic probes are arranged in the side wall in the region of the extension.

In another embodiment of the cement premixer, at least two ultrasonic probes, preferably three or four ultrasonic probes, project into the treatment space distributed at equal angles to each other about the axis of symmetry of the side wall.

In another embodiment of the cement premixer, at least one ultrasonic probe has a longitudinal axis and the longitudinal axis is arranged at an angle of from 50° to 70°, in particular from 55° to 65°, with respect to the axis of symmetry of the side wall of the treatment container and is oriented toward the bottom of the treatment container.

In this case, the ultrasonic probe has one end inside the treatment space, which is oriented towards the bottom of the treatment container.

In another embodiment of the cement premixer, the stirring unit is arranged in such a way that, in operation, the intake of solids takes place in the center of the treatment space.

The center of the cement premixer is located around the shaft of the stirring unit. Due to the rotation of the shaft with the attached stirring unit tools, a so-called trombe formation occurs. This formed trombe conveys the material downwards to the stirring unit elements in the center or in the area of the longitudinal axis of the device and lets it rise again along the edge of the cement premixer.

In this way, a flow in the medium can be achieved, with the cement suspension passing the sonotrodes again and again. The size of the trombe is determined by the speed and the stirring unit diameter, can be adapted to the dimensioning of the cement premixer.

In a further embodiment, the cement premixer may have a control and/or evaluation unit for controlling the stirring unit in such a way that operation takes place at speeds of 200 rpm to 300 rpm.

To ensure good homogenization of the cement suspension, the stirring unit can operate in a working range of 200 rpm to 300 rpm.

In another embodiment of the cement premixer, the stirring unit is configured such that, in operation, the stirring unit causes the cement suspension to be conveyed to the bottom and back up the treatment space.

For this purpose, the stirring unit has an inclination of the stirring unit blades or propellers of 50-55°, preferably 52-54°, to favor the upward and downward flow.

In a further embodiment of the cement premixer, the cement premixer has a sensor for detecting the level of the cement premixer. The level measurement can be carried out by radar waves or ultrasonic waves, for example.

In a further embodiment of the cement premixer, the control and/or evaluation unit is designed to control the agitation speed of the stirring unit and/or to control the ultrasonic oscillator, preferably the energy input of the ultrasonic oscillator, as a function of the determined filling level.

In particular, the control and/or evaluation device can control or record the specific energy input per unit volume of the cement suspension. However, this energy input can also be calculated.

In a further embodiment, the control and/or evaluation device can also control the supply of cement, water and, optionally, admixtures. The supply of water can, for example, take place via the status of the level measurement in the treatment container.

In a further embodiment, the control and/or evaluation device can also control the flow of the cement suspension, for example as a function of the energy input per unit volume of the cement suspension.

The invention also comprises a device for producing a concrete mix comprising a concrete mixer and a cement premixer according to the invention.

The cement premixer can be connected to the concrete mixer fluidically, preferably by a flange connection between an outlet of the cement premixer and an inlet of the concrete mixer.

The connection can be made mechanically, with the fit of the tubes, for example, ensuring the connection.

In another embodiment of the device, the device comprises at least one of the following elements: a first cement container, a second cement container, a water tank, and/or an admixture container, wherein the inlet is formed as an inlet pipe or inlet shaft, which is detachably connected, preferably by means of a flange connection, to at least one first cement container and/or one water tank and/or one additional container of the device.

In another embodiment of the device, the device comprises a metering device between the cement premixer and the concrete mixer, which regulates the metering of the cement suspension depending on the amount of sand, gravel or grit added.

The quantity of sand, gravel or grit (aggregate) fed in can be detected by sensors or via the feed time when the valve is open. A flow rate sensor or a weighing belt can also record the corresponding quantity of aggregate.

The metering device is located between the outlet of the cement premixer and the inlet of the concrete mixer.

The concrete mixer may also be equipped with ultrasonic probes that can introduce ultrasonic oscillations into the concrete or mortar mix.

The invention is also based on a method for providing a cement suspension, comprising at least the following steps:

- Providing cement, water, and optionally at least one admixture into a treatment container having a treatment space;
- Mixing by means of at least one stirring unit projecting at least partially into the treatment space to produce a cement suspension;
- Transmission of ultrasonic oscillations to the cement suspension by means of at least one ultrasonic probe projecting at least partially into the treatment space;
- Discharge of the cement suspension via an outlet for further processing, in particular into a concrete mixer.

The addition of admixtures is optional. When providing the cement suspension, admixtures can be dispensed with, in which case only cement and water are provided.

In particular, in the method for producing a cement suspension, cement, water and optionally admixtures are suspended in a cement premixer according to the invention.

In Particular, the Cement Suspension Contains from 50 parts by weight to 80 parts by weight cement
from 20 parts by weight to 40 parts by weight water
from 0 to 10 parts by weight admixture based on the total mass of the cement suspension, with all components in the cement suspension adding up to 100 parts by weight.

The above-mentioned admixtures are to be understood as concrete admixtures. These are liquid, powdery, or granular substances that are added to the concrete during mixing in small quantities, based on the cement content. They influence the properties of the fresh or hardened concrete by chemical and/or physical action. In concrete according to DIN EN 206-1/DIN 1045-2 (in the current version as of July 2019), only concrete admixtures according to DIN EN 934-2 (in the current version) or concrete admixtures with general building authority approval may be used. Aggregates are generally not considered to be concrete admixtures.

In particular, in the method according to the invention, the stirring unit is operated at a speed of 50 rpm to 500 rpm.

In particular, the ultrasonic probes transmit ultrasound in the frequency range from 16 kHz to 30 kHz, especially in the frequency range from 18 kHz to 22 kHz into the cement suspension, with an intensity in the range from 5 W/cm$^2$ to 100 W/cm$^2$.

The concrete or mortar is produced, in particular, using a combination of the cement premixer according to the invention and a concrete mixer.

The method can be operated either in a batch process or in a continuous process. In the batch process, the constituents are added to the treatment container, mixed under ultrasound and by stirring to form an activated cement suspension, and then transferred to a concrete mixer, for example. In the continuous process, the ingredients are continuously added to the treatment container and the process is operated in such a way that the activated cement suspension can be continuously withdrawn from the cement premixer and transferred to the concrete mixer, for example.

The cement premixer according to the invention enables particularly efficient homogenization and physical and chemical activation of the cement binder. Since the ultrasonic treatment in the cement premixer is limited to the components cement, water and, optionally, admixtures, the energy generated by high-frequency ultrasonic oscillations can be used directly to activate the cement binder. This allows a significantly improved utilization of the energy input compared to the use of ultrasonic oscillations on a mixture of cement, water, admixtures and chemically inactive sand, gravel or grit. The reactive part of the concrete, cement, and water forms only 20-35% of the concrete, while the chemically inactive part, sand, gravel and grit, forms the remaining part. Therefore, with the device according to the invention, the energy is spent on a much smaller proportion of materials and is therefore used much more efficiently. In addition, the generation of the cement suspension in the cement premixer makes it possible to achieve a much better degree of mixing compared to conventional methods.

Due to the improved activation of the reactive part of the concrete and homogenization of the cement suspension in the cement premixer, a significant reduction of the cement content can be achieved. Furthermore, the heat treatment time can be drastically reduced. For various applications, heat treatment can be dispensed with entirely.

In addition, the use of the cement premixer according to the invention accelerates concrete curing and improves the workability (processing properties) of the concrete.

The cement premixer according to the invention also has the advantage of being able to be integrated very easily and cost-effectively into an existing concrete mixing plant as an additional module without great effort. The arrangement of the introduction opening for the supply of cement (from cement weigher) and, optionally, water, as well as the outlet to the flow supply line for the discharge of the finished cement suspension is particularly suitable for such integration. The mechanical interface, preferably a flange, further improves efficient integration.

By using the level measurement, the feed quantity of cement and/or water can be determined via the change of the filling level.

The combination of the use of the ultrasonic probes with the stirring unit proves to be particularly advantageous. Cement and water require significantly higher mixing intensities than the aggregate of the concrete for complete pulping. Therefore, a synergistic interaction of the stirring unit with the ultrasonic oscillations was shown to produce an activated cement suspension.

The stirring unit according to the invention, especially in combination with the application of ultrasonic energy, enables a relatively low speed to produce a homogeneous suspension. This results in lower power consumption as well as reduced wear of the stirring unit.

The present invention, as can be seen from the foregoing description, can be used for diverse applications in the field of concrete and mortar production. Accordingly, the present invention opens up a wide range of possible applications and uses, for example in the production of precast concrete elements.

The variants and features mentioned and described herein may also be carried out in combination of two or more variants or features with each other and such combinations are also encompassed by the present invention, given such combinations are not mutually inconsistent.

BRIEF DESCRIPTION OF THE DRAWING FIGURES

An exemplary embodiment of the invention is now described in more detail below with reference to the accompanying drawing.

Herein, FIG. 1 shows a schematic cross-sectional view of an exemplary embodiment of the cement premixer according to the present invention;

DETAILED DESCRIPTION

Figure 1:
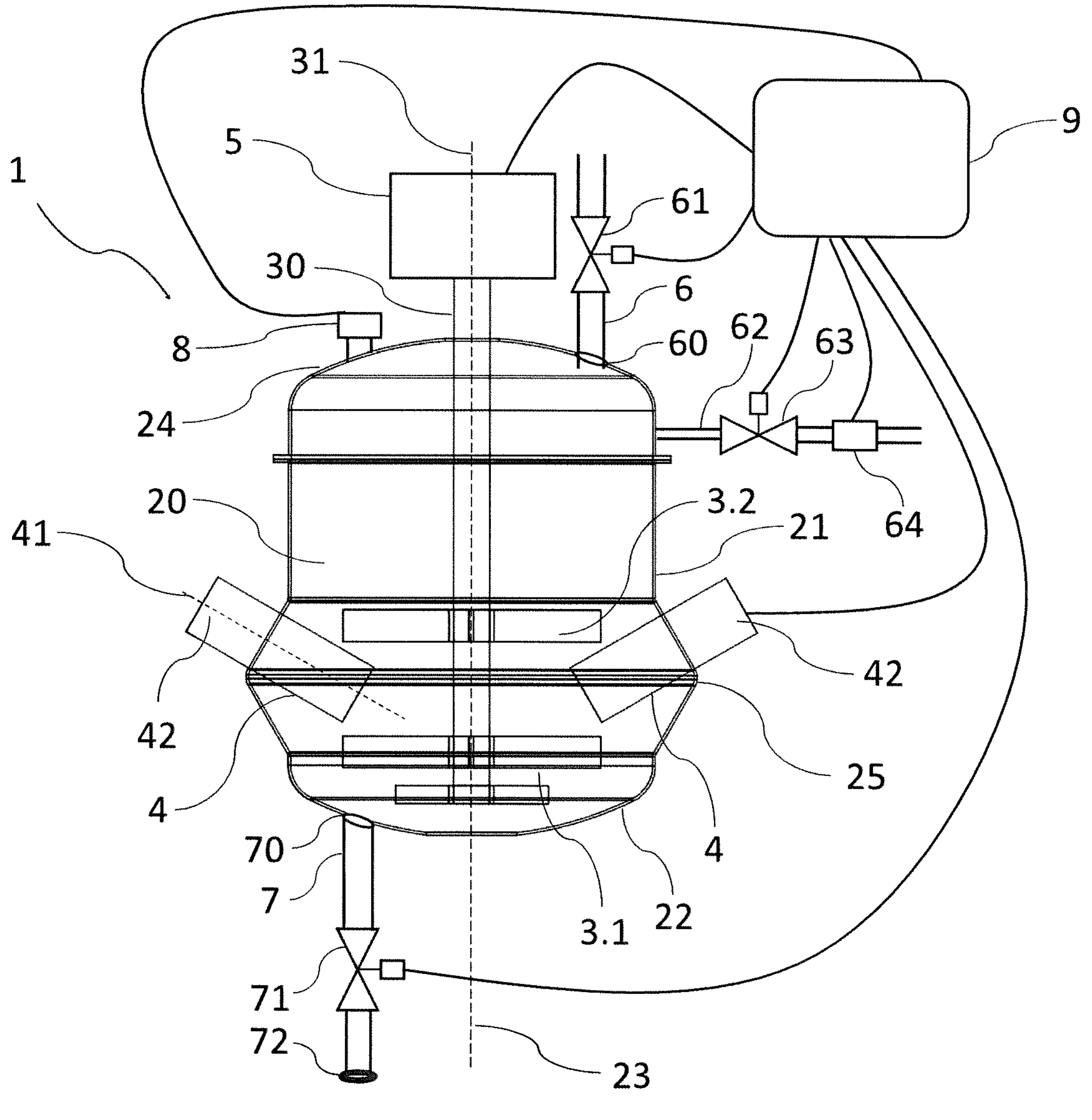

The following stipulation applies to the entire further description: If reference numerals are included in a figure for the purpose of graphic clarity, but are not explained in the directly associated descriptive text, reference is made to their mention in preceding figure descriptions.

As can be seen in FIG. 1, the cement premixer 1 comprises a treatment container 2, which has a treatment space 20. The treatment space 20 is delimited laterally by a rotationally symmetrical side wall 21 and downwardly by a bottom 22. Upwardly, the treatment space is closed by a lid 24. A stirring unit 3 with a shaft 30 projects into the treatment space 20, wherein the shaft projects into the treatment space through an opening in the lid 24.

In this embodiment, the side wall 21 has an outward extension 25 in the lower half. Four ultrasonic probes 4 are mounted in this area.

In this embodiment, the stirring unit 3 has two agitators (3.1, 3.2) that are attached to the shaft 30. The agitator blades of the agitators (3.1, 3.2) are spaced so that they do not touch the ultrasonic probes 4. The shaft 30 is set into rotary motion via the rotary disk by an external drive 5.

The shaft has an axis of rotation 31 coinciding with the axis of symmetry 23 of the side wall 21. The extension 25 is arranged concentrically to the axis of symmetry 23 outward (away from the axis of symmetry 23).

Laterally, at an angle of 60° to the vertical axis of symmetry 23 of the side wall 21, are the ultrasonic probes 4, which are directed downward toward the bottom 22.

In this embodiment, a control and/or evaluation unit 9 records the parameters filling level, energy input by the ultrasonic probes, and added water quantity by the water quantity meter 64. It controls the drive 5 for the stirring unit 3 (setting the number of revolutions of the stirring unit 3), the ultrasonic oscillators 42 in amplitude and frequency of the ultrasound (in this case, the energy input is determined by the control and/or evaluation unit 9), the solids valve 61, the water control valve, and the discharge of the suspension via the metering valve 71.

Furthermore, there is an introduction opening 60 in the lid 24, into which a pipe 6 for the supply of solids projects. This is controlled via the solids valve 61. In this embodiment, cement is added and the addition of cement is controlled via the solids valve 61. A water introduction line 62 for water is arranged through the side wall 21. Thus, water can be added via the water control valve 63 to produce the cement suspension. In this embodiment, the amount of water that is added is determined by the water quantity meter 64.

The level sensor 8 determines the level within the treatment space 20. This level measurement can, for example, be used by the control and/or evaluation unit as a basis for controlling the addition of water.

In the bottom 22 of the treatment container 2 there is an outlet 70 for the flow supply line 7 for discharging the finished cement suspension to the concrete mixer. The discharge of the cement suspension is controlled as a function of the specific energy input per unit volume via the metering device 71. The discharge line 7 is provided with a flange 72, with which the discharge line 7 can be quickly and easily connected to a concrete mixer.

Figure 2:
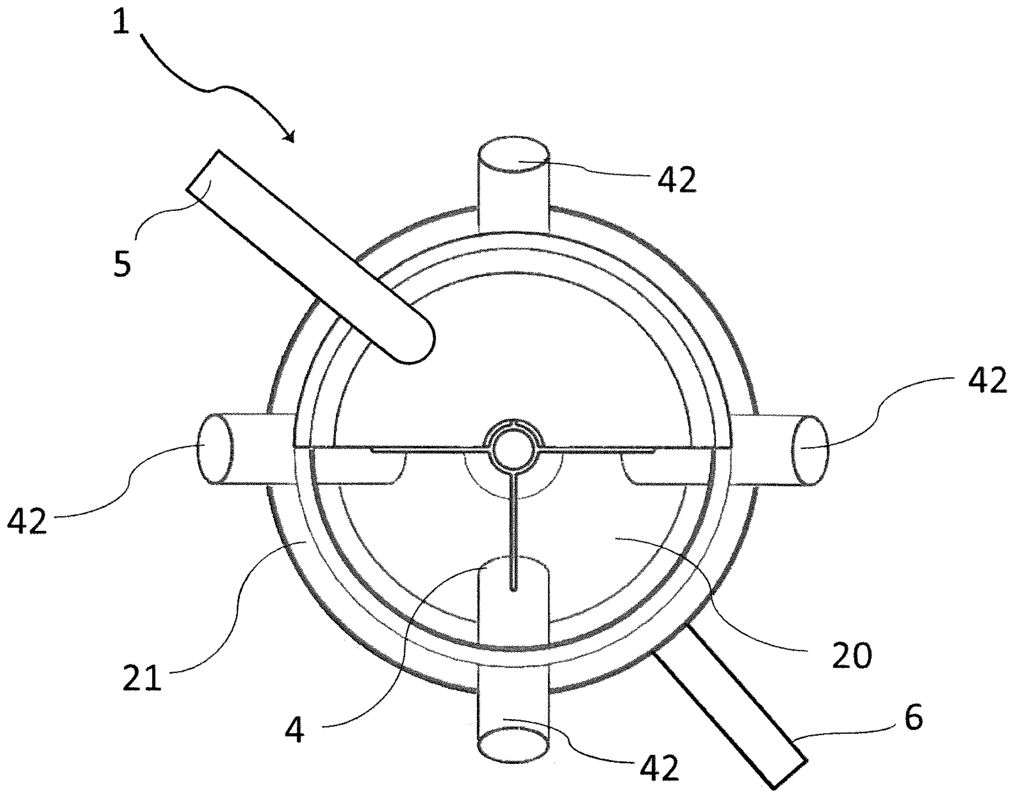
FIG. 2 shows a top view of the exemplary embodiment of FIG. 1.

FIG. 2 shows a top view of the embodiment of FIG. 1, wherein the arrangement of the four ultrasound probes 4 with an angle of 90° to each other in the side wall 21 is particularly visible here. The view into the treatment space 20 shows that the ultrasonic probes 4 are directed towards the axis of symmetry 23 of the side wall 21.

A flange can be coupled to the drive by means of mounting holes to allow the drive of the shaft 30 and thus the stirring unit 3.1 and 3.2.

Figure 3:
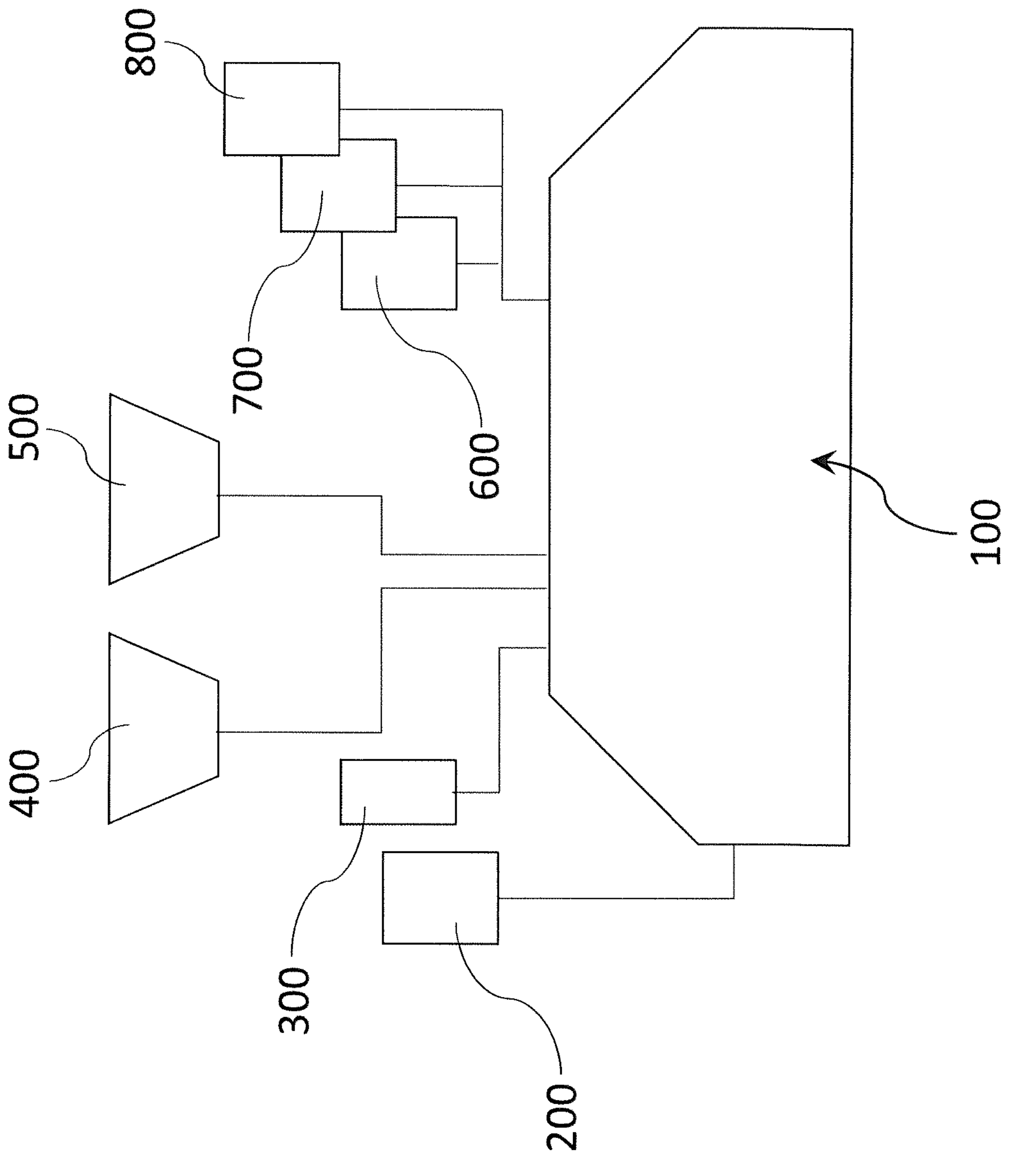
FIG. 3 shows a schematic diagram of concrete production by conventional methods.

FIG. 3 schematically shows the process according to the conventional method. In a concrete mixer 100, water is poured from the water inlet 200, admixtures from the admixture container 300, cement from the first or second cement container 400 and 500 and aggregate (sand, gravel and/or grit) from the corresponding containers 600, 700 and 800. The components are mixed directly in the concrete mixer to obtain a concrete mix.

Figure 4:
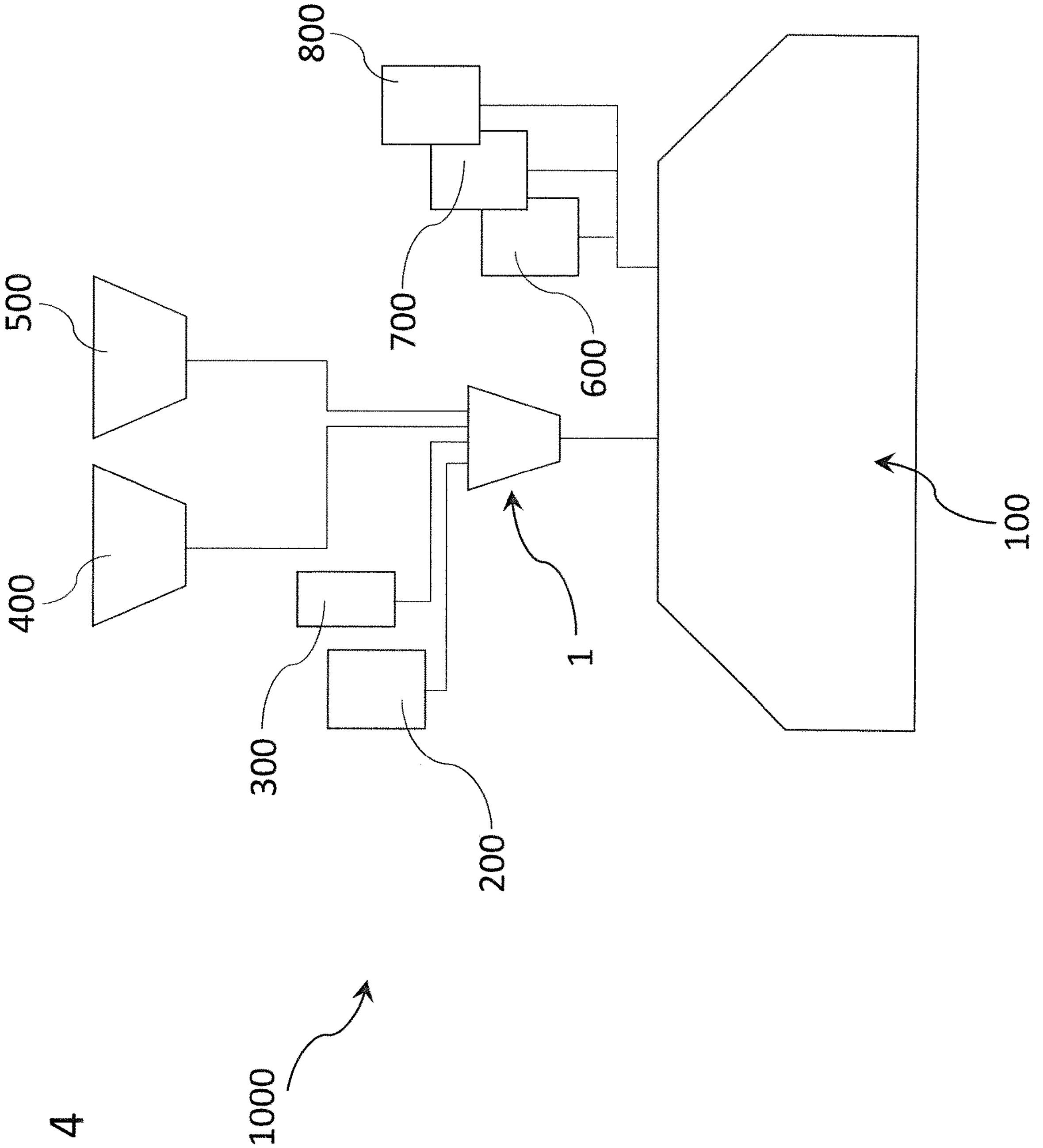
FIG. 4 shows a schematic diagram of a concrete production according to one embodiment of the present invention.

In contrast to this conventional mode of operation, in the method according to the invention, which is shown schematically according to an embodiment in FIG. 4, a cement suspension is generated separately in the cement premixer 1. In this process, water from the water inlet 200 and cement from the cement containers 400 and/or 500 and, optionally, admixtures from the admixture container 300 are processed in the cement premixer to form a cement suspension. This cement suspension is then transferred from the cement premixer 1 to the concrete mixer 100. In the concrete mixer, the aggregate from the corresponding containers 600, 700 and 800 is then added to produce the concrete mix, which can then be further processed.

The combination of the cement premixer 1 and the concrete mixer 100 forms the device 1000 for producing a concrete mix.

The preparation of the activated cement suspension can be operated either in a batch process or in a continuous process.

EXAMPLE

A concrete was produced by the method according to the invention for producing a cement suspension.

A laboratory-scale cement premixer according to the invention, as shown in FIG. 1, with a diameter of 400 mm up to 493 mm at the widest point and a total height of 550 mm, is distributed with 4 ultrasonic probes (sonotrodes) at 90° to each other around the axis of symmetry of the treatment container.

The treatment space contains 45 kg of cement, 20 liters of water and 0.5 kg of superplasticizer (admixture).

The stirring unit is operated at a speed of 250 revolutions per minute. Oscillations are transmitted in the low ultrasonic range of 20 kHz via the sonotrodes into the treatment space.

By using the ultrasonic treatment and the mixing tool, a fast and efficient homogenization of the cement suspension is achieved within less than 180 seconds.

The cement suspension produced in this way is transferred to a concrete mixer. Here, 225 kg of aggregate are added and the concrete is mixed.

The flowability of this concrete is significantly increased compared to conventional production methods and the early strength is considerably improved. Especially in the production of precast concrete parts, this leads to decisive advantages and precast parts of better quality, which can be produced in a shorter time.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Cement premixer
2 Treatment container
20 Treatment space
21 Side wall
22 Bottom
23 Axis of symmetry
24 Lid
25 Extension of the sidewall
3 Stirring unit
3.1 First agitator
3.2 Second agitator
30 Shaft
31 Axis of rotation
32 Drive pulley
33 Mounting holes
4 Ultrasonic probe (sonotrode)
41 Longitudinal axis of the ultrasound probe
42 Ultrasonic oscillator
5 Drive
6 Inlet (solids inlet for cement)
60 Introduction opening
61 Solids valve
62 Introduction line for water
63 Water control valve
64 Water quantity meter
7 Flow supply line
70 Outlet
71 Metering device
72 Flange
8 Level sensor for the level in the cement premixer
9 Control and/or evaluation unit
100 Concrete mixer
200 Water inlet
300 Admixture container
400 Cement container
500 Second cement container
600 Sand container
700 Gravel container
800 Grit container
1000 Device

The invention claimed is:

1. A cement premixer, comprising a treatment container having a treatment space, wherein the treatment container comprises a side wall and a bottom;

a stirring unit at least partially projecting into the treatment space, wherein the stirring unit is connected to a shaft having an axis of rotation;

at least one ultrasound probe at least partially projecting into the treatment space;

at least one ultrasonic oscillator configured to emit ultrasound to the at least one ultrasonic probe;

a first introduction opening configured to supply cement;

a solids valve coupled between the first introduction opening and a solids supply container;

a water line coupled to a second introduction opening via a water control valve;

an outlet for a flow supply line to supply an activated cement suspension from the cement premixer into a concrete mixer;

a regulating valve coupled between the outlet and the concrete mixer; and a control and/or evaluation unit configured to generate transient cavitation in an ultrasonic field of the at least one ultrasonic oscillator in the treatment space and activate the cement in the treatment space by adjusting the emitted ultrasound to have an intensity of 25-250 W/cm$^2$ and an amplitude of amplitude is 15-500 μm while controlling the stirring unit to stir the cement and water, and causing the ultrasonic probe to transmit ultrasound in a frequency range from 18 kHz to 22 kHz, and wherein the control and/or evaluation unit is further configured to control the solids valve, the water control valve, and the regulating valve so that the cement premixer premixes cement in a batch process.

2. The cement premixer of claim 1, wherein the cement premixer has a flange configured for connection to the concrete mixer.

3. The cement premixer of claim 1, wherein the at least one ultrasonic probe at least partially projects into the treatment space through the side wall of the treatment container.

4. The cement premixer of claim 1, wherein the treatment container has an axially symmetrical and rotationally symmetrical side wall, wherein an axis of symmetry of the side wall extends parallel to the axis of rotation of the stirring unit.

5. The cement premixer of claim 4, wherein the side wall has an extension in a half towards the bottom, wherein the extension extends around an entire circumference of the side wall concentrically to the axis of symmetry.

6. The cement premixer of claim 5, wherein the at least one ultrasonic probe comprises three or more ultrasonic probes projecting into the treatment space distributed at a same angle to one another about the axis of symmetry of the side wall.

7. The cement premixer of claim 6, wherein the three or more ultrasonic probes are arranged in a region of the extension in the side wall.

8. The cement premixer of claim 4, wherein the at least one ultrasonic probe has a longitudinal axis and the longitudinal axis is arranged at an angle of 55° to 65° to the axis of symmetry of the side wall of the treatment container and is aligned in a direction of the bottom of the treatment container.

9. The cement premixer of claim 1, wherein the cement premixer has a control and/or evaluation unit configured to control the stirring unit in such a way that operation takes place at speeds of 200 revolutions per minute to 300 revolutions per minute.

10. The cement premixer of claim 1, further comprising:
- a level sensor configured to determine a filling level of the cement premixer.

11. The cement premixer of claim 10, wherein the control and/or evaluation unit is configured to control an agitation speed of the stirring unit or an energy input of the ultrasonic oscillator as a function of the determined filling level.

12. A device for producing a concrete mix, the device comprising:
- a concrete mixer;
- an aggregate container coupled to the concrete mixer and configured to supply aggregate to the concrete mixer; and
- a cement premixer, which the cement premixer comprises
  - a treatment container having a treatment space, wherein the treatment container comprises a side wall and a bottom;
  - a stirring unit at least partially projecting into the treatment space, wherein the stirring unit is connected to a shaft having an axis of rotation;
  - at least one ultrasound probe at least partially projecting into the treatment space;
  - at least one ultrasonic oscillator configured to emit ultrasound to the at least one ultrasonic probe;
  - a first introduction opening configured to supply cement; a solids valve coupled between the first introduction opening and a solids supply container;
  - a water line coupled to a second introduction opening via a water control valve;
  - an outlet for a flow supply line to supply an activated cement suspension from the cement premixer into the concrete mixer;
  - a regulating valve coupled between the outlet and the concrete mixer; and
  - a control and/or evaluation unit configured to generate transient cavitation in an ultrasonic field of the at least one ultrasonic oscillator in the treatment space and activate the cement in the treatment space by adjusting the emitted ultrasound to have an intensity
    - of 25-250 W/cm$^3$ and amplitude of 15-500 μm while controlling the stirring unit to stir the cement and water, and
    - causing the emitted ultrasound to transmit ultrasound in a frequency range from 18 kHz to 22 kHz, and
- wherein the control and/or evaluation unit is further configured to control the solids valve, the water control valve, and the regulating valve so that the cement premixer premixes cement in a batch process, and
  - wherein the concrete mixer is configured to mixer premixed cement from the cement premixer supplied via the regulating valve with aggregate from the aggregate container.

13. The device of claim 12, wherein the cement premixer is fluidically connected to the concrete mixer by a flanged connection between the outlet of the cement premixer and an inlet of the concrete mixer.

14. The device of claim 13, further comprising at least one of the following:
- a first cement container;
- a second cement container;
- a water inlet; and
- an admixture container,
- wherein the inlet of the concrete mixer is an inlet pipe or inlet shaft, wherein the inlet pipe or inlet shaft is detachably connected by a flange connection to at least the first cement container, the water inlet, or the admixture container.

15. A method, comprising:
- supplying cement, via a solids valve, and water, via a water control valve, into a treatment container having a treatment space;
- mixing, by at least one stirring unit at least partially projecting into the treatment space, the supplied cement and water;
- transmitting, by at least one ultrasonic probe at least partially projecting into the treatment space while the at least one stirring unit mixes the supplied cement and water, ultrasonic oscillations having an intensity, amplitude, and ultrasonic frequency that activates the cement in the treatment space to form an activated cement suspension and that generates transient cavitation in the treatment space, wherein the intensity is 25-250 W/cm$^3$, the amplitude is 15-500 μm, and the ultrasonic frequency is in a frequency range from 18 kHz to 22 kHz;
- discharging the activated cement suspension via an outlet for further processing in a concrete mixer; and
- mixing, by the concrete mixer, the activated cement suspension with aggregate,
- wherein the solids valve, the water control valve, and a regulating valve coupled between an outlet of the cement premixer and the concrete mixer are controlled so that the cement premixer premixes cement in a batch process.

16. The method of claim 15, wherein the discharging of the cement suspension is performed according to a specific energy input per unit volume of the cement suspension.

17. The method of claim 15, wherein, based on a total mass of the cement suspension, with all components in the cement suspension adding up to 100 parts by weight, the cement suspension is from 20 parts by weight to 80 parts by weight cement;
from 20 parts by weight to 80 parts by weight water; and
from 0 to 10 parts by weight admixture.

18. The method of claim 15, wherein ultrasonic oscillations are generated by at least one ultrasonic oscillator, which applies ultrasound to the at least one ultrasonic probe.

19. The method of claim 15, wherein the stirring unit is operated at a speed of 200-300 revolutions per minute.

* * * * *